US011500113B2

(12) United States Patent
Wilson et al.

(10) Patent No.: US 11,500,113 B2
(45) Date of Patent: Nov. 15, 2022

(54) SPECTRAL NOISE SEPARATION AND CANCELLATION FROM DISTRIBUTED ACOUSTIC SENSING ACOUSTIC DATA

(71) Applicant: Halliburton Energy Services, Inc., Houston, TX (US)

(72) Inventors: Glenn Andrew Wilson, Houston, TX (US); Henry Clifford Bland, Calgary (CA)

(73) Assignee: Halliburton Energy Services, Inc., Houston, TX (US)

( * ) Notice: Subject to any disclaimer, the term of this patent is extended or adjusted under 35 U.S.C. 154(b) by 681 days.

(21) Appl. No.: 16/547,143

(22) Filed: Aug. 21, 2019

(65) Prior Publication Data
US 2020/0072993 A1 Mar. 5, 2020

Related U.S. Application Data

(60) Provisional application No. 62/724,520, filed on Aug. 29, 2018.

(51) Int. Cl.
*G01V 8/16* (2006.01)
*G01V 1/16* (2006.01)
(Continued)

(52) U.S. Cl.
CPC .............. *G01V 1/16* (2013.01); *G01V 1/226* (2013.01); *G01V 1/46* (2013.01); *G01V 8/16* (2013.01);
(Continued)

(58) Field of Classification Search
CPC . G01V 1/16; G01V 1/226; G01V 1/46; G01V 8/16; G01V 2210/1234; G01V 2210/1429
See application file for complete search history.

(56) References Cited

U.S. PATENT DOCUMENTS 6,023,658 A    2/2000 Jeffryes
2006/0098531 A1  5/2006 Gardner et al.
(Continued)

FOREIGN PATENT DOCUMENTS

EP    3035083 A1 * 6/2016 ............. E21B 47/12
WO    2016039928      3/2016
(Continued)

OTHER PUBLICATIONS

Halliburton, FiberVSP™ Service, Distributed Acoustic Sensing (DAS) for VSP, H012684, Jan. 2019.
(Continued)

*Primary Examiner* — Krystine E Breier
(74) *Attorney, Agent, or Firm* — John Wustenberg; C. Tumey Law Group PLLC

(57) ABSTRACT

A method for improving a signal-to-noise ratio of distributed acoustic sensing data may comprise transmitting an acoustic wave from an acoustic source into a subterranean formation, recording a first acoustic noise at a first time interval with a distributed acoustic sensing system, recording at least one acoustic wave and a second acoustic noise at a second time interval with the distributed acoustic sensing system, calculating a noise spectrum from the first time interval, calculating the noise spectrum in the second time interval, and removing the noise spectrum from acoustic data measured during the second time interval to identify acoustic data of the subterranean formation. A system may comprise an acoustic source, a distributed acoustic sensing system disposed within a well, and an information handling system.

18 Claims, 4 Drawing Sheets

(51) Int. Cl.
  *G01V 1/22* (2006.01)
  *G01V 1/46* (2006.01)
(52) U.S. Cl.
  CPC ................ *G01V 2210/1234* (2013.01); *G01V 2210/1429* (2013.01)

(56) References Cited

U.S. PATENT DOCUMENTS

2008/0068211 A1    3/2008   Aiello
2010/0172210 A1    7/2010   Clark

FOREIGN PATENT DOCUMENTS

| WO | WO-2016039928 A1 * | 3/2016 | ............ G01H 9/004 |
| WO | WO-2017023309 A1 * | 2/2017 | ............ G01V 1/308 |
| WO | 2017131822 | 8/2017 | |

OTHER PUBLICATIONS

S. Mostafa Mousavi, et al., Adaptive Microseismic Noise Estimation and Denoising, SEG International Exposition and 87th Annual Meeting, 2016.

International Search Report and Written Opinion for Application No. PCT/US2019/047554, dated Dec. 4, 2019.

* cited by examiner

SPECTRAL NOISE SEPARATION AND CANCELLATION FROM DISTRIBUTED ACOUSTIC SENSING ACOUSTIC DATA

BACKGROUND

Boreholes drilled into subterranean formations may enable recovery of desirable fluids (e.g., hydrocarbons) using a number of different techniques. Identifying the formation and fluid properties may be beneficial to operators. During completion of a well, a fiber optic cable may be temporarily or permanently deployed or conveyed into the wellbore for sensing as part of a distributed acoustic sensing (DAS) system. An acoustic (or seismic) source, disposed on or within the surface, may be activated to propagate acoustic waves into the subterranean formations. The distributed acoustic sensing system may detect and record the acoustic waves as they propagate through the subterranean formation, often referred to as a vertical seismic profile (VSP). The processing of the measured and/or recorded acoustic signals may be used to produce a model, image, or tomogram of the acoustic velocity for the subterranean formation, which may improve the identification of the formation rock and fluid properties. This process of measuring the velocity of acoustic waves and processing thereafter may be repeated to perform time-lapse models, images, or tomograms of the changes in the rock and fluid properties. The measured acoustic data may contain noise. This noise may be a product of surface facilities, artificial lift used in wells, as well as from multiphase fluid flow in a wellbore. To improve accuracy of the acoustic velocity models, images, or tomograms, this noise should be removed from the measured acoustic data prior to modeling, imaging, or tomography.

BRIEF DESCRIPTION OF THE DRAWINGS

These drawings illustrate certain aspects of some examples of the present disclosure, and should not be used to limit or define the disclosure.

DETAILED DESCRIPTION

Provided are systems and methods for increasing the signal-to-noise ratio of acoustic data collected by a distributed acoustic sensing system. As discussed below, design features may include the utilization of an acoustic source and a distributed acoustic sensing system to collect measurements of a subterranean formation. In examples, the acoustic measurements may be processed by an information handling system to remove or cancel out recorded noise that may be due to an artificial lift used in wells as well as from multiphase fluid flow in a wellbore, single- or multi-phase fluid flow within the wellbore, surface facilities above the wellbore, or cultural noise.

Figure 1:
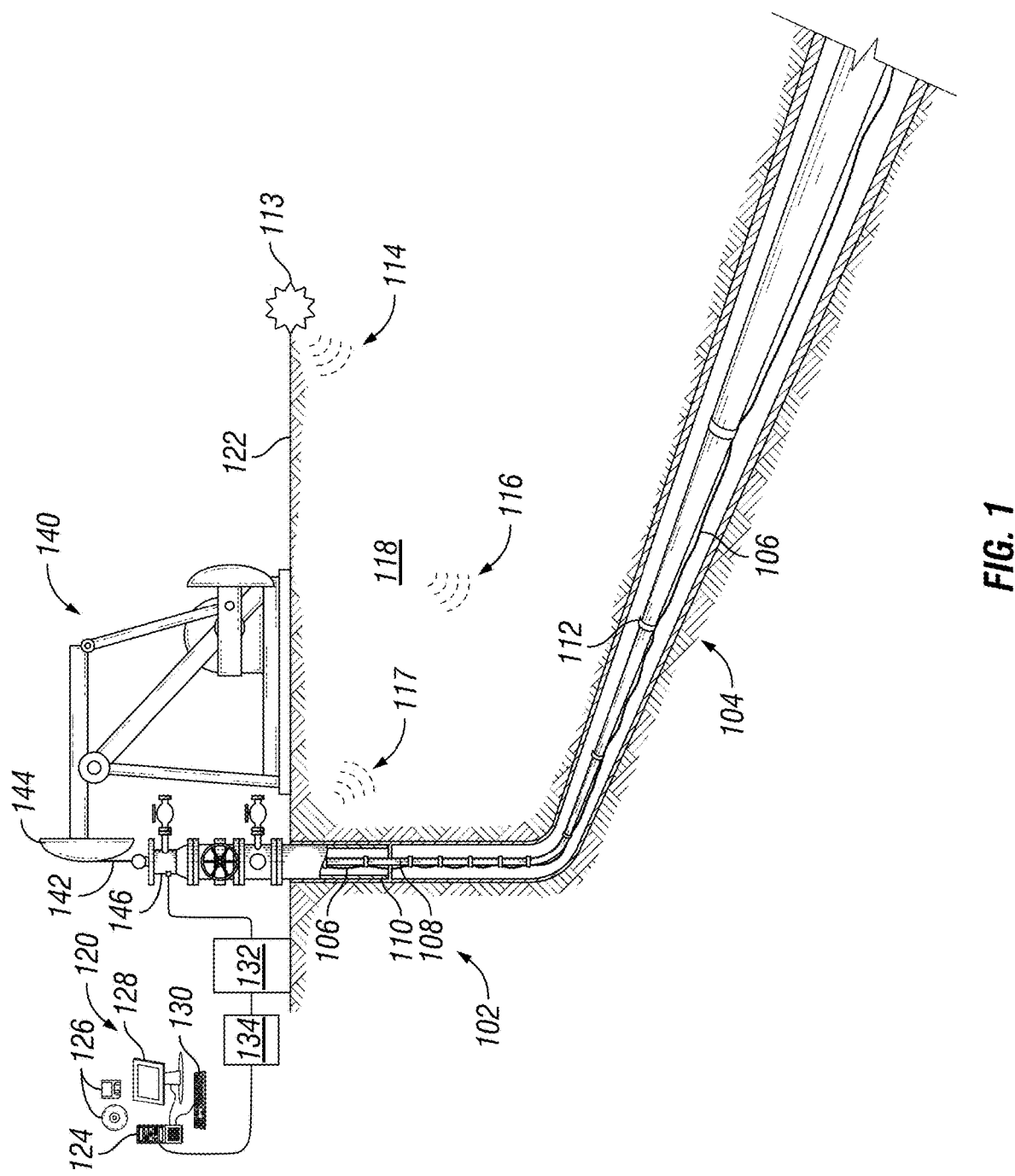
FIG. 1 illustrates an example of a distributed acoustic sensing system operating on a well system.

FIG. 1 generally illustrates an example of a well system 100 that may be used in a wellbore 102, which may include a distributed acoustic sensing ("DAS") system 104. In examples, wellbore 102 may be a steam assisted gravity drainage (SAGD) reservoir, which may be monitored by DAS system 104. It should be noted that well system 100 may be one example of a wide variety of well systems in which the principles of this disclosure may be utilized. Accordingly, it should be understood that the principles of this disclosure may not be limited to any of the details of the depicted well system 100, or the various components thereof, depicted in the drawings or otherwise described herein. For example, it is not necessary in keeping with the principles of this disclosure for completed well system 100 to include a generally vertical wellbore section and/or a generally horizontal wellbore section. Moreover, it is not necessary for formation fluids to be only produced from formation 118 since, in other examples, fluids may be injected into subterranean formation 118, or fluids may be both injected into and produced from subterranean formation 118, without departing from the scope of the disclosure. Additionally, wellbore 102 may be a producing well, an injection well, a recovery well, a monitoring well, and/or an uncompleted well. Further, while FIG. 1 generally depicts onshore systems and operation, those skilled in the art will readily recognize that the principles described herein are equally applicable to offshore systems and operation, without departing from the scope of the disclosure.

In FIG. 1, DAS system 104 may be disposed along production tubing 108 and further within casing 110. DAS system 104 may include a fiber optic cable 106. Fiber optic cable 106 may contain single-mode, multi-mode, or a plurality of fiber optic cables. In examples, fiber optic cable 106 may be permanently installed and/or temporarily installed in wellbore 102. Without limitation, DAS system 104 may operate and function to measure a time series of acoustic data. Light may be launched into the fiber optic cable 106 from surface 122 with light returned via the same fiber optic cable 106 detected at the surface 122. DAS system 104 may detect acoustic energy along the fiber optic cable 106 from the backscattered light (e.g., Rayleigh backscattering) returned to the surface 122. For example, measurement of backscattered light may be used to detect the acoustic energy (e.g., seismic waves 114, or reflected seismic waves 116, and/or unwanted signals deemed to be acoustic noise). In additional examples, Bragg Gratings or other suitable optical or electro-optical devices can be used with the fiber optic cable 106 for the detection of acoustic energy along the fiber optic cable. While FIG. 1 describes DAS system 104 and use of fiber optic cable 106 as the subsurface sensory array for detection of acoustic energy, it should be understood that examples may include other techniques for detection of acoustic energy in wellbore 102. In examples, fiber optic cable 106 may be clamped to production tubing 108. However, fiber optic cable 106 may be clamped to production tubing through connection device 112 by any suitable means. It should be noted that fiber optic cable 106 may also be cemented in place within casing 110 and/or attached to casing 110 by any suitable means. Additionally, fiber optic cable 106 may be attached to a conveyance. A conveyance may include any suitable means for providing mechanical conveyance for fiber optic cable 106, including, but not limited to coiled tubing, wireline, slickline, pipe, drill pipe, or the like. In some embodiments, the conveyance may provide mechanical suspension, as well as electrical connectivity, for fiber optic cable 106. The conveyance may comprise, in some instances, a plurality of electrical conductors extending from surface 122. The conveyance may comprise an inner core of one or a plurality of electrical conductors covered by an insulating wrap. An inner and outer steel armor sheath may be wrapped in a helix in opposite directions around the one or more conductors. At least one electrical conductor may be used for communicating power and telemetry from a downhole tool to surface 122. Information from fiber optic cable 106 may be gathered and/or processed by information handling system 120, discussed below. For example, signals recorded by fiber optic cable 106 may be stored on memory and then processed by information handling system 120. The processing may be performed real-time during data acquisition or after recovery of fiber optic cable 106. Processing may alternatively occur downhole or may occur both downhole and at surface. In some embodiments, signals recorded by fiber optic cable 106 may be conducted to information handling system 120 by way of the conveyance. Information handling system 120 may process the signals, and the information contained therein may be displayed for an operator to observe and stored for future processing and reference. Without limitation, fiber optic cable 106 may be attached to coil tubing and/or the conveyance by any suitable means. Coil tubing and the conveyance may be disposed within production tubing 108 and/or wellbore 102 by any suitable means.

Referring back to FIG. 1, DAS system 104 may function and operate to sense acoustic data for measuring seismic waves 114 and/or reflected seismic waves 116. Seismic waves 114 and/or reflected seismic waves 116 may illuminate elements (not illustrated) in subterranean formation 118. In examples, seismic waves 114 may originate from acoustic source 113. Acoustic source 113 may be permanently installed device disposed on surface 122 or within subterranean formation 118. Additionally, acoustic source 113 may be a moving platform, or is an explosive source.

Seismic waves 114 and/or reflected seismic waves 116 may induce a dynamic strain signal in fiber optic cable 106, which may be recorded by DAS system 104. Alternatively, measurement devices (not shown) may record seismic waves 114 and/or reflected seismic waves 116 and may transmit information to information handling system 120. Measuring dynamic strain in fiber optic cable 106 may include a strain measurement, a strain rate measurement, fiber curvature measurement, fiber temperature measurement, and/or energy of backscattered light measurement. A strain measurement may be performed by an operation of Brillouin scattering (via Brillouin Optical Time-Domain Reflectometry, BOTDR, or Brillouin Optical Time-Domain Analysis, BOTDA), or Rayleigh scattering utilizing Optical Frequency Domain Reflectometry (OFDR). A fiber curvature measurement may be performed using Polarization Optical Time Domain Reflectometry (P-OTDR) or Polarization-Optical Frequency Domain Reflectometry (P-OFDR). A fiber temperature measurement may be performed utilizing Raman distributed temperature sensing (DTS). An energy of backscattered light of DAS measurement may be performed utilizing an automatic thresholding scheme, the fiber end is set to the DAS channel for which the backscattered light energy flat lines. The purpose of all these measurements may be to compute the structure and properties of formation 118 at different times, including formation and fluid properties. This may allow an operator to perform reservoir imaging and/or monitoring.

Information handling system 120 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 120 may be a personal computer, a network storage device, or any other suitable device and may vary in size, shape, performance, functionality, and price. Information handling system 120 may include random access memory (RAM), one or more processing resources such as a central processing unit 124 (CPU) or hardware or software control logic, ROM, and/or other types of nonvolatile memory. Additional components of the information handling system 120 may include non-transitory computer-readable media 126, output devices 128, such as a video display, and one or more network ports for communication with external devices as well as an input device 130 (e.g., keyboard, mouse, etc.). Information handling system 120 may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Information handling system 120 may further include a single mode-multimode ("SM-MM") converter 132 and a DAS interrogator 134. SM-MM converter 132 may be used to convert the optical transmission path between one or more single-mode fibers used in the DAS interrogator and multimode fibers deployed in the wellbore. DAS interrogator 134 may be used to translate light pulses to digital information, which may be read by information handling system 120. In examples, information handling system 120 may communicate with DAS interrogator 134 and act as a data processing system that analyzes measured and/or collected information. This processing may occur at surface 122 in real-time. Alternatively, the processing may occur at surface 122 and/or at another location. In examples, information handling system 120 may interface with the acoustic source to measure and record auxiliary signals of the acoustic source, including but not limited to time (e.g., GPS time), time break, vibration sweep, ground force, and/or pressure.

Further illustrated in FIG. 1 is a standard surface pumping jack 140, which may be installed at a surface 122 of wellbore 102. A steel cable or bridle 142 may extend from a horsehead 144 of pumping jack 140. Bridle 142 may be coupled to a polished rod (not illustrated), disposed in production tubing 108, by a standard carrier bar (not illustrated). At a position further down-hole, a polished rod (not illustrated) may be coupled with a sucker rod (not illustrated), both disposed in production tubing 108. In one example of the present invention, the sucker rod may include steel rods that are screwed together to form a continuous "string" that connects the sucker rod pump inside of production tubing 108 to pumping jack 140.

A stuffing box 146 may be provided at the top of production tubing 108 in order to seal the interior of production tubing 108 and prevent foreign matter from entering. Stuffing box 146 may be a packing gland or chamber to hold packing material (not shown) compressed around a moving pump rod or polished rod to prevent the escape of gas and/or liquid. The polished rod may provide a smooth transition at stuffing box 146 and may allow for the polished rod to operate in an upward and downward motion without displacing stuffing box 146 or production tubing 108.

The movement of at least the sucker rod in production tubing 108 may produce acoustic noise 117. Without limitation, cultural (or environmental) noises, vibration from wellbore flow, a mechanical device, artificial lift from mechanical devices, an electromechanical device, a surface facility, cultural noise (i.e., naturally occurring noise), and/or industrial facilities may produce acoustic noise 117. In examples, acoustic noise 117 may contaminate acoustic data recorded by DAS system 104. Removing acoustic noise 117 from the measurements may improve signal-to-noise ratio for subsequent modeling, imaging, and/or tomography. Additionally, acoustic noise 117 may only increase in high rate wells, which may further contaminate acoustic data.

Figure 2:
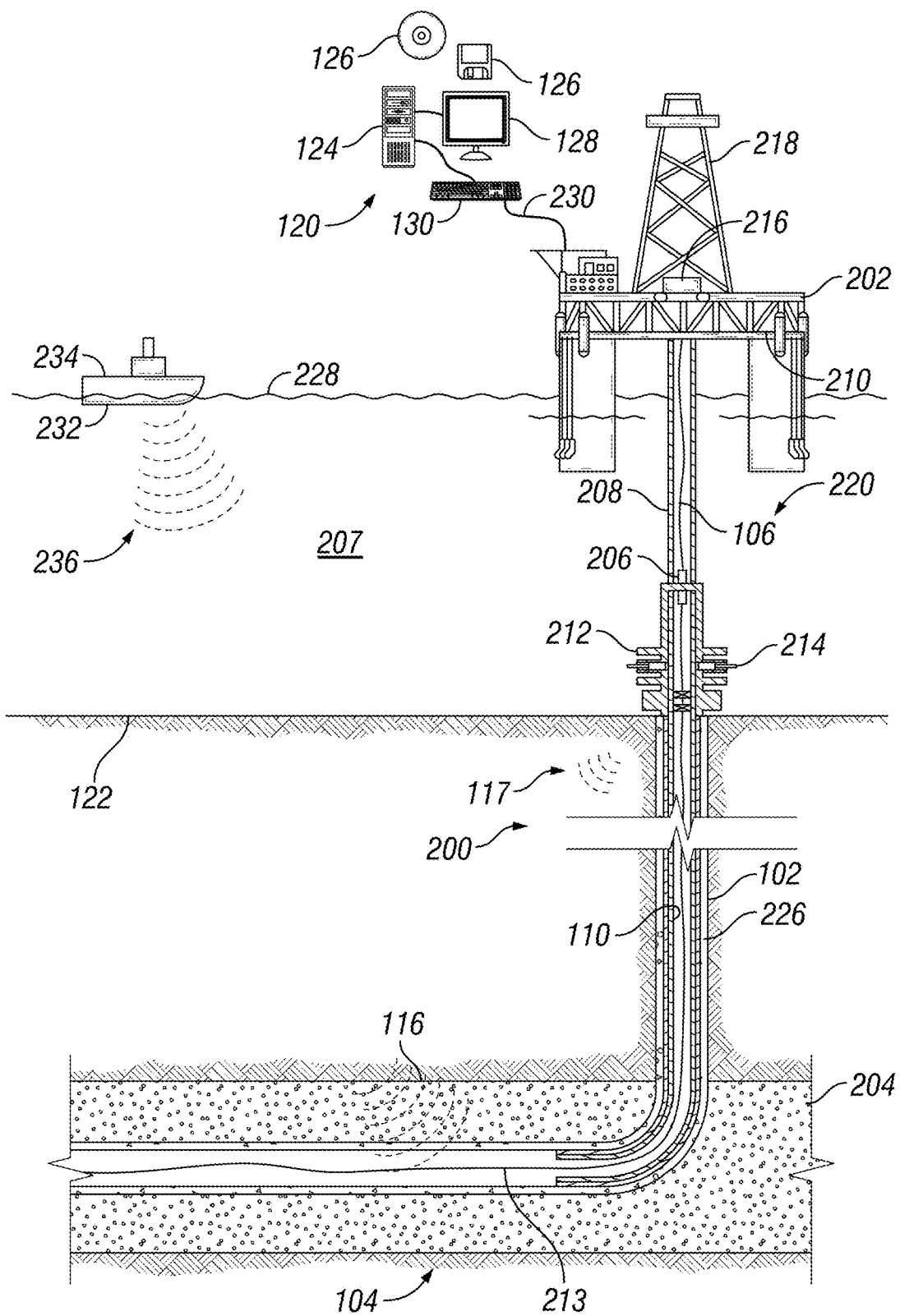
FIG. 2 illustrates an example well system offshore.

FIG. 2 illustrates an example of a well system 200 operating from a platform 202 in a subsea operation. Platform 202 may be centered over a subterranean formation 204 located below surface 122 of a body of water 207. A conduit 208 may extend from deck 210 of platform 202 to wellhead installation 212 including blow-out preventers 214. Platform 202 may have a hoisting apparatus 216 and a derrick 218 for raising and lowering tubular strings. Additionally, fiber optic cable 106 may traverse through conduit 208 and connect to fiber connection 206 at one end of fiber connection 206. A downhole fiber 213 may connect to the opposite end of fiber connection 206 and traverse trough casing 110 and wellbore 102.

A wellbore 102 may extend through the various earth strata including subterranean formation 204. While well system 200 is shown disposed in a horizontal section of wellbore 102, wellbore 102 may include horizontal, vertical, slanted, curved, and other types of wellbore geometries and orientations in which well system 200 may be disposed, as will be appreciated by those of ordinary skill in the art. Casing 110 may be cemented within wellbore 102 by cement 226.

In examples, a DAS system 104, compatible for offshore applications may be used to measure subterranean formations near well system 200. In examples, acoustic source 232 may be towed behind a boat 234 that may travel along the surface 228 of body of water 207. Alternatively, acoustic source 232 may be disposed below or within body of water 207 at surface 122 as a node (not illustrated). In another example, acoustic source 232 may be disposed and actuated downhole within wellbore 102. Acoustic source 232 may be actuated to produce acoustic waves 236 which may travel down towards and interact with subterranean formation 204. Acoustic waves 236 may reflect off formation 204 as reflected seismic waves 116. Reflected seismic waves 116 may be recorded and measured by fiber optic cable 106. Measurements and data recorded from acoustic waves or reflected seismic waves 116 may be transmitted uphole to information handling system 120 for further processing. As discussed above, movement of downhole devices within conduit 208 may produce acoustic noise 117. Without limitation, water movement, marine animals, vibration from wellbore flow, artificial lift, and/or industrial facilities may produce acoustic noise 117. As in FIG. 2, acoustic noise 117 may contaminate acoustic data recorded by DAS system 104. Removing acoustic noise 117 from the measurements may improve signal-to-noise ratio for subsequent modeling, imaging, and/or tomography.

FIGS. 1 and 2 illustrate an example of DAS system 104 deployed for measurement operations. FIGS. 3A-3D illustrate examples of different types of deployment of fiber optic cable 106 in wellbore 102 (e.g., referring to FIGS. 1 and 2).

Figure 3:
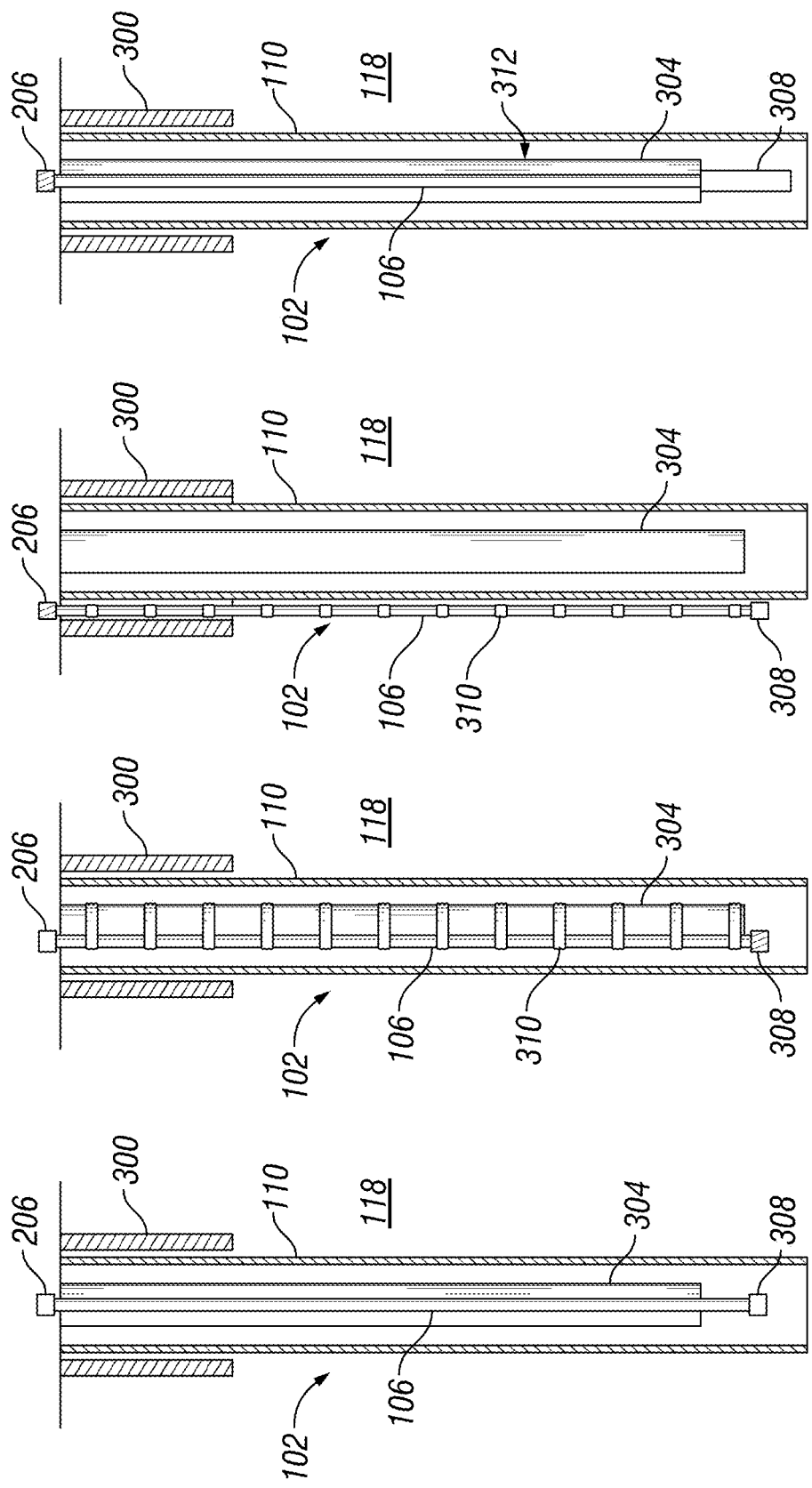
FIGS. 3A-3D illustrate different examples of a fiber optic cable deployed downhole in a distributed acoustic sensing system.

In examples, fiber optic cable 106 may be permanently deployed in wellbore 102 via single- or dual-trip completion strings, behind casing, on tubing, or in pumped down installations. Additionally, fiber optic cable 106 may be temporarily deployed via coiled tubing, wireline, slickline, or disposable cables. As illustrated in FIG. 3A, wellbore 102 deployed in formation 118 may include surface casing 300 in which production casing 110 may be deployed. Additionally, production tubing 304 may be deployed within production casing 110. In this example, of fiber optic cable 106 may be temporarily deployed in a wireline system in which a downhole tool 308 is connected to the distal end of fiber optic cable 106. Further illustrated, of fiber optic cable 106 may be coupled to a fiber connection 206. Fiber connection 206 may operate with an optical feedthrough system (itself comprising a series of wet- and dry-mate optical connectors) in the wellhead that may optically couple fiber optic cable 106 from the tubing hanger to a wellhead instrument panel.

FIG. 3B illustrates an example of permanent deployment of fiber optic cable 106. As illustrated in wellbore 102 deployed in formation 118 may include surface casing 300 in which production casing 110 may be deployed. Additionally, production tubing 304 may be deployed within production casing 110. In examples, fiber optic cable 106 is attached to the outside of production tubing 304 by one or more cross-coupling protectors 310. Without limitation, cross-coupling protectors 310 may be evenly spaced and may be disposed on every other joint of production tubing 304. Further illustrated, fiber optic cable 106 may be coupled to fiber connection 206 at one end and a downhole tool 308 at the opposite end.

FIG. 3C illustrates an example of permanent deployment of fiber optic cable 106. As illustrated in wellbore 102 deployed in formation 118 may include surface casing 300 in which production casing 110 may be deployed. Additionally, production tubing 304 may be deployed within production casing 110. In examples, fiber optic cable 106 is attached to the outside of production casing 110 by one or more cross-coupling protectors 310. Without limitation, cross-coupling protectors 310 may be evenly spaced and may be disposed on every other joint of production tubing 304. Further illustrated, fiber optic cable 106 may be coupled to fiber connection 206 at one end and a downhole tool 308 at the opposite end.

FIG. 3D illustrates an example of a coiled tubing operation in which fiber optic cable 106 may be deployed temporarily. As illustrated in FIG. 3D, wellbore 102 deployed in formation 118 may include surface casing 110 in which production casing 110 may be deployed. Additionally, coiled tubing 312 may be deployed within production casing 110. In this example, fiber optic cable 106 may be temporarily deployed in a coiled tubing system in which a downhole tool 308 is connected to the distal end of downhole fiber. Further illustrated, fiber optic cable 106 may be attached to coiled tubing 312, which may move fiber optic cable 106 through production casing 110. Further illustrated, fiber optic cable 106 may be coupled to fiber connection 206 at one end and downhole tool 308 at the opposite end.

Referring back to FIGS. 1 and 2, systems and methods within this disclosure may be implemented, at least in part, with information handling system 120. As previously described, information handling system 120 may communicate with DAS system 104 and act as a data processing system that analyzes acoustic data. This processing may occur above surface 122 on platform 202 in real-time. Alternatively, the processing may occur above surface 122 and/or at another location. Without limitations, DAS system 104 may be connected to and/or controlled by information handling system 120. In examples, a communication link 230 may be provided which may transmit data from DAS system 104 to information handling system 120 on platform 202. Without limitations, the communication link may be wired and/or wireless. Information handling system 120 may include a processing unit 124, output device 128, an input device 130 (e.g., keyboard, mouse, etc.), and/or non-transitory computer-readable media 126 (e.g., optical disks, magnetic disks) that may store code representative of the methods described herein. In examples, acoustic noise 117 may also be generated by water body 207, wildlife, industrial facilities, and wellbore operations may introduce acoustic noise 117 on a continuous basis. Acoustic noise 117 may be recorded and measured by DAS system 104. This may overlap, washout, and skew acoustic waves 236 and reflected seismic waves 116.

Figure 4:
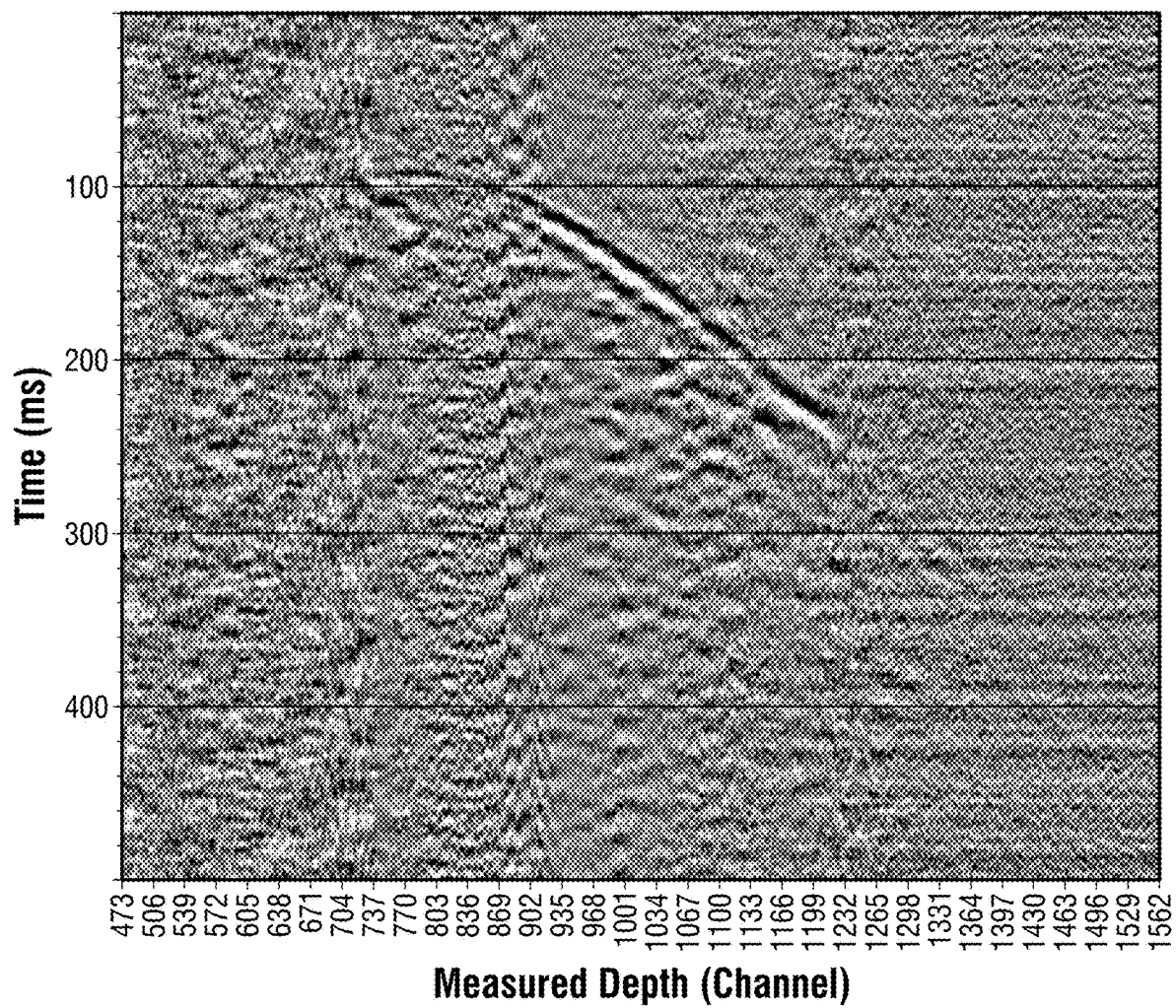
FIG. 4 illustrates an example DAS seismic tomogram.

During measurement operations of acoustic data, as discussed above, acoustic noise 117, seismic waves 114, and/or reflected seismic waves 116 (e.g., referring to FIG. 1) may be recorded together by DAS system 104 (e.g., referring to FIG. 1) as acoustic data. The acoustic data may be processes into a seismic model, an image, a tomogram, or a petrophysical model. FIG. 4 illustrates an example acoustic data contaminated with acoustic noise 117. The acoustic data may be produced from measurements recorded by DAS system 104 during measurement operations. These measurements may be processed by information handling system 120 to produce a model, image, or tomogram. Acoustic noise 117 may skew measurements and/or cover seismic waves 114 and/or reflected seismic waves 116 (e.g., referring to FIG. 2). This may render subsequent processing to models, images, or tomographs inaccurate. Recorded acoustic noise 117 be localized and/or periodic, thereby making it difficult to remove via common mode noise rejection, F-X deconvolution, bandpass filtering, and/or combinations thereof. Without limitation, examples of localized and/or period acoustic noise 117 may be produced from wellbore flow, artificial lift, industrial facilities, and/or combinations thereof. In examples, the acoustic data may be measured and subject to post-processing in order to increase the signal-to-noise ratio (SNR). The methods and systems disclosed below may be used to increase the SNR by cancelling acoustic noise 117 via quantification of its spectral characteristics.

With reference to FIGS. 1 and 2, information handling system 120 may communicate with DAS system 104 and act as a data processing system that analyzes information and/or measurements collected by DAS system 104. Information handling system 120 may be able to produce a VSP with the collective measurements acquired from DAS system 104. Information handling system 120 may apply post-processing techniques to acoustic data in order to increase the SNR. This processing may occur at surface 122 and/or downhole in real-time. Alternatively, the processing may occur at surface 122 and/or at another location after measurement operations. Further, information handling system 120 may be used for time-lapse reservoir monitoring by conducting a plurality of surveys over a period of time. Depending on the point in time in which a survey is conducted, information handling system 120 may be able to correct the travel time and/or velocity model of each acoustic wave at depths near surface 122.

In examples, information handling system 120 may employ a proactive noise cancellation technique based on spectral analysis of the noise. Typically, acoustic (or seismic) data acquisition may include discrete measurement intervals that contain acoustic waves and/or reflected seismic waves. Following the trigger to begin recording data, acoustic noise 117 may be measured for a time interval, which is temporally separated into first and second time intervals. These time intervals do not have to be of equal duration. Signal during the first time interval is noise only, denoted N. Signal during the second time interval M is a linear combination of acoustic signals B and noise signals N. In examples, information handling system 120 may calculate the acoustic noise spectrum for a first time interval N (i.e., before the first arrival of an acoustic wave), and equates the amplitude and phase of the noise in the second time interval that is inclusive of acoustic responses B and acoustic noise N. The acoustic noise spectrum amplitude and phase may be subtracted from the measured data amplitude and phase from the second time interval to produce higher SNR acoustic data B for subsequent processing to models, images, or tomograms. Without limitations, information handling system 120 may employ noise cancellation. Equations (1) and (2) show how noise cancellation may be utilized:

$$M = B + N \quad (1)$$

$$B = IST(FT(M) - ST(N)) \quad (2)$$

The DAS system measures a time series, which is temporally separated into first and second time intervals. Signal during the first time interval is noise only, denoted N. Signal during the second time interval M is a linear combination of acoustic signals B and noise signals N. This assumes that the noise sources may be constant in both time intervals. Given the short duration of both time intervals (even if different durations), this is a reasonable approximation for VSP acquisition. As shown, ST is a spectral transform operator applied to a time series data to generate spectral data, and may include any algorithms representative of discrete Fourier transforms operator, identified as FT, or discrete wavelet transforms. In examples, ST may transform acoustic data from a time domain to a frequency domain. The noise signal in the second time interval is equated to the noise-only signal N from the first time interval. Assuming the spectral content of the noise is identical in the first and second time intervals, the spectral noise signal may be subtracted from the linear combination of the spectral acoustic and noise signals to yield the spectral acoustic signal only. As shown, IST is an inverse spectral transform operator applied to spectral data to generate a time series data, and may include any algorithms representative of inverse discrete Fourier transforms or inverse discrete wavelet transforms. The IST is applied to the denoised spectral seismic signal to generate the acoustic signal B. However, as described, this concept neglects that the first and second time intervals may be different durations. Thus, while the amplitude of the noise between the first and second intervals may be the same, the phase of the noise between the first and second time intervals must be corrected. Otherwise, the process may actually increase noise via constructive interference, thus degrading SNR of the acoustic data.

To remedy this noise phase correction, the first time interval is immediately after the trigger to start recording and in the absence of any acoustic energy, is a direct measurement of a first acoustic noise N. The second time interval for measured acoustic data M is immediately after the first time interval concludes, and may be a measure of an acoustic response B, and a second acoustic noise measurement N', wherein N' is shown below in Equations (3) and (4). It may be assumed that the amplitude of acoustic noise 117 in the first time interval is identical to the amplitude of the acoustic noise 117 of the second time interval. The first time interval starts at $t_0$ and ends at $t_1$, such that the time duration of the time interval is $t_1-t_0$. For each frequency $\omega$ in the spectral domain, a phase propagation term $\phi(\omega)$) is calculated to evaluate the temporal phase difference between $t_0$ and $t_1$; such that the amplitude and phase of N and N' are equated at time $t_1$. The spectral noise and acoustic responses in the second time interval are then evaluated as:

$$ST(N')=ST(N)+\phi(\omega)) \quad (3)$$

$$B=IST(ST(M)-ST(N')) \quad (4)$$

In examples, the spectral noise cancellation may be performed for any given trace or record of acoustic measurements. This trace-by-trace noise separation and cancellation process may be performed in real-time and/or during a post-processing workflow. In VSPs, there typically is sufficient time between the shot time break and the acoustic first arrival wherein the first time interval may be established. In other examples, a dedicated first time interval, or delay, may be introduced to information handling system 120 to enable sufficient recording of a noise-only measurement prior to the time-break. Additionally, a third time interval may be recorded after the second time interval such that the acoustic noise spectrum within the second time interval may be estimated from the acoustic noise spectrum from both the first and third time intervals. After determining recorded acoustic noise 117 (e.g., referring to FIG. 1) and removing the recorded acoustic noise 117 from the acoustic wave measurements, an acoustic data may be created that may be free of the recorded acoustic noise 117. Without limitations, well operations may be performed based at least in part of the acoustic velocity models, images, or tomograms derived from the acoustic data. Furthermore, without limitations, well operations may be performed based at least in part on petrophysical models derived from rock physics relations applied to the acoustic velocity models, images, or tomograms. For example, well operations may include drilling operations, production operations, completion operations, and/or the like.

Statement 1: A method for improving a signal-to-noise ratio of distributed acoustic sensing data acquired from a borehole in a subterranean formation may comprise transmitting a seismic wave from an acoustic source into a subterranean formation, recording a first acoustic data comprising at a first time interval with a distributed acoustic sensing system, recording a second acoustic data comprising at a second time interval with the distributed acoustic sensing system, determining an acoustic noise in the first acoustic data at the first time interval, and calculating a third acoustic data by subtracting the acoustic noise from the second acoustic data, wherein the third acoustic data comprises a reflected seismic wave and wherein the reflected seismic waves is the seismic wave after interaction with the subterranean formation.

Statement 2: The method of statement 1, wherein the second time interval is immediately after the first time interval.

Statement 3. The method of statements 1 or 2, further comprising measuring auxiliary signals of the acoustic source including at least one of time, time break, vibration sweep, ground force, or pressure.

Statement 4. The method of statements 1-3, wherein the third acoustic data is calculated by B=IST(ST(M)−ST(N')), wherein B is the third acoustic data, IST is an inverse spectral transform from frequency to time domain, ST is a spectral transform from a time domain to a frequency domain, M is the second acoustic data, and N' is a second acoustic noise calculated from the acoustic noise.

Statement 5. The method of statements 1-4, wherein the acoustic source is a permanently installed device.

Statement 6. The method of statement 5, wherein the acoustic source is a moving platform or an explosive source.

Statement 7. The method of statements 1-5, wherein the acoustic source is disposed on a surface.

Statement 8. The method of statements 1-5 or 7, wherein the acoustic source is disposed within the subterranean formation.

Statement 9. The method of statements 1-5, 7, or 8, wherein the acoustic noise are from at least one of a mechanical device, an electromechanical device, a surface facility, or cultural noise.

Statement 10. The method of statements 1-5 or 7-9, further comprising forming a seismic model, an image, a tomogram, or a petrophysical model using the third acoustic data that is at least partially free of acoustic noise.

Statement 11. The method of statement 10, further comprising performing a well operation based at least partially on the seismic model, the image, or the tomogram.

Statement 12. A system for improving a signal-to-noise ratio of distributed acoustic sensing data may comprise an acoustic source, wherein the acoustic source is configured to produce a seismic wave in a subterranean formation, a distributed acoustic sensing system disposed within a wellbore, wherein the distributed acoustic sensing system is configured to measure acoustic data during a time interval, and an information handling system. The information handling system may be configured to segment the time interval into a first time interval and a second time interval, determine an amplitude and a phase of an acoustic noise spectrum in the first time interval, remove the amplitude and a phase of the acoustic noise spectrum from the acoustic data during the second time interval to determine the acoustic data of the subterranean formation.

Statement 13. The system of statement 12, wherein the second time interval is immediately after the first time interval.

Statement 14. The system of statements 12 or 13, wherein the distributed acoustic sensing system is further configured to measure auxiliary signals of the acoustic source including at least one of time, time break, vibration sweep, ground force, or pressure.

Statement 15. The system of statements 12-14, wherein the information handling system is further configured to calculate the acoustic data of the subterranean formation with equation B=IST(ST(M)−ST(N')), wherein B is the acoustic data calculated during the second time interval, IST is an inverse spectral transform from frequency to time domain, ST is a spectral transform from a time domain to a frequency domain, M is the acoustic data from the second time interval, and N' is an acoustic noise predicted from the acoustic data in the second time interval.

Statement 16. The system of statements 12-15, wherein the acoustic noise is from a mechanical device, an electromechanical device, a surface facility, or cultural noise.

Statement 17. The system of statements 12-16, wherein the information handling system is configured to produce at least one of a seismic model, an image, a tomogram, or a petrophysical model using the acoustic data that is at least partially free of acoustic noise.

Statement 18. The system of statements 12-17, wherein the acoustic source is a permanently installed device.

Statement 19. The system of statement 18, wherein the acoustic source is disposed on a surface.

Statement 20. The system of statement 18, wherein the acoustic source is disposed within the subterranean formation.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces. Furthermore, it is implied that "acoustic" is synonymous with "seismic".

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for improving a signal-to-noise ratio of distributed acoustic sensing data acquired from a borehole in a subterranean formation, comprising:

transmitting a seismic wave from an acoustic source into a subterranean formation;
   recording a first acoustic data comprising at a first time interval with a distributed acoustic sensing system;
   recording a second acoustic data comprising at a second time interval with the distributed acoustic sensing system;
   determining an acoustic noise in the first acoustic data at the first time interval; and
   calculating a third acoustic data by subtracting the acoustic noise from the second acoustic data, wherein the third acoustic data comprises a reflected seismic wave, wherein the reflected seismic waves is the seismic wave after interaction with the subterranean formation, wherein the third acoustic data is calculated by $B=IST(ST(M)-ST(N'))$, wherein B is the third acoustic data, IST is an inverse spectral transform from frequency to time domain, ST is a spectral transform from a time domain to a frequency domain, M is the second acoustic data, and N' is a second acoustic noise calculated from the acoustic noise.

2. The method of claim 1, wherein the second time interval is immediately after the first time interval.

3. The method of claim 1, further comprising measuring auxiliary signals of the acoustic source including at least one of time, time break, vibration sweep, ground force, or pressure.

4. The method of claim 1, wherein the acoustic source is a permanently installed device.

5. The method of claim 1, wherein the acoustic source is a moving platform or an explosive source.

6. The method of claim 1, wherein the acoustic source is disposed on a surface.

7. The method of claim 1, wherein the acoustic source is disposed within the subterranean formation.

8. The method of claim 1, wherein the acoustic noise are from at least one of a mechanical device, an electromechanical device, a surface facility, or cultural noise.

9. The method of claim 1, further comprising forming a seismic model, an image, a tomogram, or a petrophysical model using the third acoustic data that is at least partially free of acoustic noise.

10. The method of claim 9, further comprising performing a well operation based at least partially on the seismic model, the image, the tomogram, or the petrophysical model.

11. A system for improving a signal-to-noise ratio of distributed acoustic sensing data comprising;

an acoustic source, wherein the acoustic source is configured to produce a seismic wave in a subterranean formation;
   a distributed acoustic sensing system disposed within a wellbore, wherein the distributed acoustic sensing system is configured to measure acoustic data during a time interval; and
   an information handling system, wherein the information handling system is configured to:
      segment the time interval into a first time interval and a second time interval;
      determine an amplitude and a phase of an acoustic noise spectrum in the first time interval;
      remove the amplitude and a phase of the acoustic noise spectrum from the acoustic data during the second time interval to determine the acoustic data of the subterranean formation, and
      calculate the acoustic data of the subterranean formation with equation $B=IST(ST(M)-ST(N'))$, wherein B is the acoustic data calculated during the second time interval, IST is an inverse spectral transform from frequency to time domain, ST is a spectral transform from a time domain to a frequency domain, M is the acoustic data from the second time interval, and N' is an acoustic noise predicted from the acoustic data in the second time interval.

12. The system of claim 11, wherein the second time interval is immediately after the first time interval.

13. The system of claim 11, wherein the distributed acoustic sensing system is further configured to measure auxiliary signals of the acoustic source including at least one of time, time break, vibration sweep, ground force, or pressure.

14. The system of claim 11, wherein the acoustic noise is from a mechanical device, an electromechanical device, a surface facility, or cultural noise.

15. The system of claim 11, wherein the information handling system is configured to produce at least one of a seismic model, an image, a tomogram, or a petrophysical model using the acoustic data that is at least partially free of acoustic noise.

16. The system of claim 11, wherein the acoustic source is a permanently installed device.

17. The system of claim 16, wherein the acoustic source is disposed on a surface.

18. The system of claim 16, wherein the acoustic source is disposed within the subterranean formation.

* * * * *